Nov. 9, 1937.　　　　W. J. WRIGHTON　　　　2,098,411
PLATED ARTICLE
Filed March 16, 1934
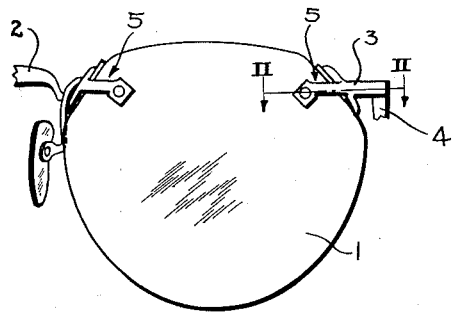
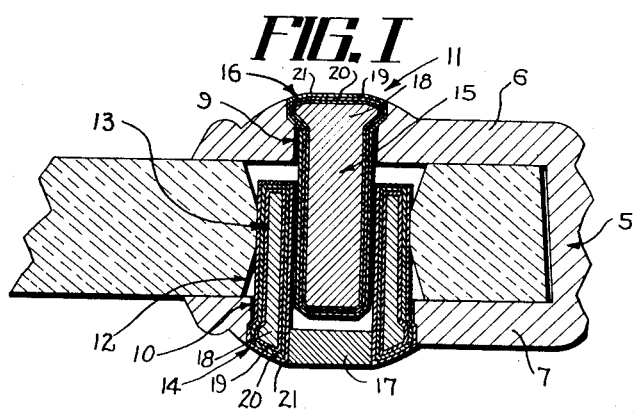
FIG. I
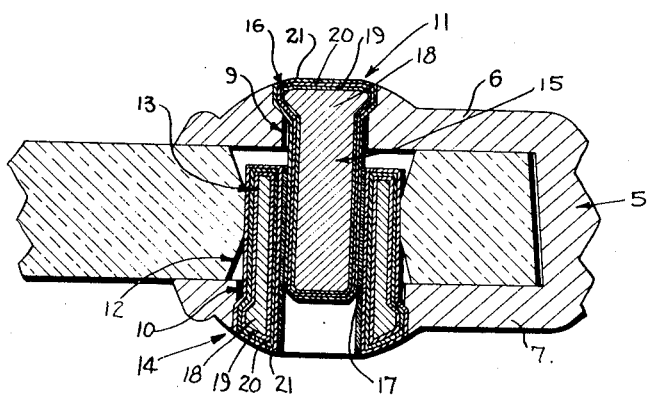
FIG. II
FIG. III
INVENTOR
William J. Wrighton
BY
Harry H. Styll
ATTORNEY Patented Nov. 9, 1937

2,098,411

UNITED STATES PATENT OFFICE 2,098,411

PLATED ARTICLE

William J. Wrighton, Southbridge, Mass., assignor to American Optical Company, Southbridge, Mass., a voluntary association of Massachusetts Application March 16, 1934, Serial No. 715,963

2 Claims. (Cl. 113—112)

This invention relates to improvements in plated articles and has particular reference to improved means and method of treating correlated plated surfaces possessing no capillary attraction so as to give them a fluid elevating or depressing power.

One of the principal objects of this invention is to provide improved means and method of treating correlated surfaces of plated articles between which solder means associated therewith normally will not flow, so as to give them the power of capillary attraction to lift or depress the solder means when the articles are subjected to heat.

Another object of the invention is to provide an improved process of forming articles of the above character having a required heat conductivity, non-corrosive nature and color and which will possess the power of capillary attraction.

Another object is to provide rhodium plated connecting members having solder means associated therewith, and process of making the same, whereby the solder means will readily flow between said connecting members when they are subjected to heat.

Another object is to provide improved means and process of treating rhodium plated connecting members having solder means associated therewith and having a required heat conductivity, non-corrosive nature and desired surface color, for attaching glass articles having attaching openings therein to holding means having similar attaching openings aligned with the attaching openings in the glass articles, by placing the connecting members and solder means associated therewith in cooperative relation with each other in said aligned openings and thereafter subjecting the parts to heat to cause the solder to melt and be drawn between said parts by capillary attraction and when cool to adhere thereto and integrally unite the same and which will not alter the surface quality and requirements of said rhodium plated connecting members.

Other objects and advantages of the invention will become apparent from the following description taken in connection with the accompanying drawing and it will be apparent that many changes may be made in the details of construction, arrangement of parts and steps of the process shown and described without departing from the spirit of the invention as expressed in the accompanying claims. I, therefore, do not wish to be limited to the exact details of construction, arrangement of parts, and steps of the process shown and described as the preferred form only has been shown by way of illustration.

Referring to the drawing,

Fig. I is a fragmentary front elevation of an ophthalmic mounting illustrating one embodiment of the invention.

Fig. II is an enlarged sectional view of connecting members embodying the invention and showing the relation of the parts and solder means prior to subjecting the parts to heat; and Fig. III is a view similar to Fig. II showing the relation of the connecting members and solder means after they have been subjected to heat.

The invention is shown herein as applied to an ophthalmic mounting for use in connecting the lenses to their lens holding means, but it is apparent that it may be applied to other uses in other arts and all of which are included in this invention.

Recent developments in the optical art, particularly in forming rimless type mountings, wherein the lenses are supported by relatively small metallic holding means connected to the lenses, have brought about separate connecting members having solder means associated therewith for securing the holding means to the lenses. The procedure of forming such mountings was to form lens holding means having aligned openings therein and to place the said openings in aligned relation with an attaching opening in the lens and to thereafter place the separate connecting members having solder means associated therewith in telescoped relation with each other in said aligned openings. The assembled parts were then subjected to heat to cause the solder to melt and flow therebetween and were thereafter allowed to cool so that the solder would congeal and adhere thereto and integrally unite the same.

During the development of such mountings and to meet the requirements as to color, non-corrosive nature, etc., it was necessary to produce a mounting having its metallic parts formed with a white non-corrosive finish and to produce connecting means of a similar nature and color for securing the metallic parts to the lenses.

This type of mounting, due to the desired use of connecting means having heat softenable solder means associated therewith for securing the lenses to their holding means and to the requirement of the use of a metal having the proper resistance or heat conductivity so that the heating of the parts could be definitely controlled to avoid overheating and breakage of the lenses, and also due to the color and non-corrosive requirements of the metallic parts used in forming said connecting means, produced an exceptionally difficult and troublesome problem. This problem was due mostly to the fact that no metal could be found which possessed all of the above characteristics. Metals having some of the essential requirements failed in others, particularly in having the proper color and non-corrosive nature and which, when the parts were assembled and subjected to heat, possessed the required capillary attraction to draw the molten solder between the connecting members. It, therefore, is one of the primary objects of this invention to overcome the above difficulties by providing novel means and process of producing connecting means possessing all of the above desired characteristics, and the required capillary attraction for drawing the molten solder between the connecting members when the parts are assembled and heated.

Referring more particularly to the drawing wherein like characters of reference designate like parts throughout the several views, the device embodying the invention, and which is shown herein only by way of illustration, is a rimless type ophthalmic mounting having the usual lenses 1 connected by a bridge member 2 and having supports 3 to which the temples 4 are pivotally attached.

The bridge member 2 and temple supports 3 are attached to lens holding members 5 having lens face engaging arms 6 and 7 formed with aligned openings 9 and 10 therein, connected, as shown in Figures II and III, to the lenses 1 by connecting means 11 which extends through said aligned openings 9 and 10 and an attaching opening 12 formed in the lens.

The connecting means 11 comprises a tubular member 13 extending within the aligned openings 9, 10 and 12 and having an enlarged head 14 engaging one of the lens face engaging arms, and a pin member 15 in telescoped relation with the tubular member in said aligned openings and having an enlarged head 16 engaging the other lens face engaging arm.

The tubular member 13, as shown in Fig. II has a wad or disc of solder 17 frictionally secured therein by pressing, which when the parts are in assembled relation with each other and are subjected to heat is adapted to melt and flow between said parts as shown in Fig. III, and when cool is adapted to adhere thereto and integrally unite the same. The heating apparatus employed by applicant and which is not shown operates electrically and the heat generated at the connection is controlled primarily by the resistant nature or heat conductivity of the metal used in forming the connecting means.

The problem dealt with by applicant is to provide a pin 15 and tubular member 13 having the proper resistance or heat conductivity so that the parts will not become overheated with a danger of breaking the lenses or of burning out the solder during the soldering operation, that will be of a desired non-corrosive nature, that will have a white like non-tarnishable surface and which when the surfaces are correlated will possess the required capillary attraction to draw soft solder means associated therewith between said surfaces when the tube and pin are heated.

To accomplish the above results applicant forms his pin and tube from a selected base or foundation metal 18 such as bronze, brass or some other suitable metal having a relatively low and proper heat resistance or conductivity. These metals although essential from the above standpoint are of an undesirable corrosive and tarnishable nature, and to overcome this defect applicant next electroplates the base 18 with a thin layer 19 of yellow gold, preferably of 24 karat, or with some other non-corrosive metal having a similar nature to render the said base non-corrosive and non-tarnishable. This surface, although providing protection against corrosion is not of the proper color, hardness and durability, and to obtain this result applicant next electroplates the said members with a surface 20 having a hard, white, non-corrosive and durable finish. This surface is preferably formed of rhodium.

The above combination produces the required results as to heat conductivity, non-corrosive nature, color, and durability, but it was found that when the parts thus formed were assembled and subjected to heat the rhodium surfaces lacked the necessary lifting action or capillary attraction to draw or carry the solder up in the very small space allowed between the pin and tube. Hence, some means had to be provided to accomplish this result and which would not alter or in any way injure the color and non-corrosive nature of the rhodium surface. This result is accomplished by placing an electro tin plating 21 on said members, which when they are assembled and subjected to heat will readily alloy with the solder and provide the necessary capillary lift to cause the solder to run in between the said pin and tube, as shown in Fig. III, and which, when cool, will allow the solder to adhere thereto and integrally unite the same. The tin plating, under the action of heat, alloys slightly with the rhodium and forms a readily solderable surface.

It is apparent that although applicant has shown and described the above process as applied to pin and tube type connecting means, any rhodium surfaces or any members which are to be united by solder may be treated in the above manner to render them more susceptible to soldering even in instances wherein the heat conductivity of the parts is immaterial. It is also to be understood that each surface is prepared by known methods such as by rattling the parts or otherwise preparing them to receive each of the electro-plated surfaces prior to performing each plating operation.

After the parts are united their exposed surfaces may be polished in the usual prior art manner.

From the foregoing description it will be seen that applicant has provided simple, efficient and economical means and process of accomplishing all of the objects and advantages of the invention, particularly of providing rhodium plated surfaces having the required capillary attraction or lift to draw a very thin layer of solder between the parts and of forming the said parts of base metals having the required heat conductivity to enable the successful performing of the soldering operations without injuring said parts or the means to which they are connected.

Having described my invention I claim:

1. A method consisting in coating a body of base metal having a relatively high electric resistance and which is normally of a corrosive and tarnishable nature with an electrically deposited plating of a material having a non-corrosive and non-tarnishable nature but which is relatively soft and non-durable, coating said non-corrosive plating with an electric plating of rhodium to obtain the color desired of said body and to form a relatively durable surface thereon, plating the rhodium surface with a coating of material which will alloy with solder and with said rhodium surface on the application of heat and then soldering said coated metal body to another body having a surface thereon which will adhere to solder by placing the said bodies in correlated relation with each other, associating solder with said bodies and applying heat thereto of sufficient temperature to bring about alloying of the coating on said rhodium surface with said surface and alloying of the solder with the surfaces of said correlated bodies which when cool will secure them together.

2. A method consisting in coating a body of base metal having a relatively high electric resistance and which is normally of a corrosive and tarnishable nature with an electrically deposited plating of gold having a non-corrosive and non-tarnishable nature but which is relatively soft and non-durable, coating said gold plating with an electric plating of rhodium to obtain the color desired of said body and to form a relatively durable surface thereon, plating the rhodium surface with a coating of material which will alloy with solder and with said rhodium surface on the application of heat and then soldering said coated metal body to another body having a surface thereon which will adhere to solder by placing the said bodies in correlated relation with each other, associating solder with said bodies and applying heat thereto of sufficient temperature to bring about alloying of the coating on said rhodium surface with said surface and alloying of the solder with the surfaces of said correlated bodies which when cool will secure them together.

WILLIAM J. WRIGHTON.